United States Patent [19]

Cortright et al.

[11] Patent Number: 5,736,478

[45] Date of Patent: Apr. 7, 1998

[54] CATALYST TO DEHYDROGENATE PARAFFIN HYDROCARBONS

[75] Inventors: Randy D. Cortright, Madison; James A. Dumesic, Verona, both of Wis.

[73] Assignee: Wisconsin Alumni Research Foundation, Madison, Wis.

[21] Appl. No.: 724,944

[22] Filed: Oct. 2, 1996

Related U.S. Application Data

[63] Continuation-in-part of Ser. No. 410,230, Mar. 24, 1995, abandoned.

[51] Int. Cl.$^6$ .................................................. B01J 21/00
[52] U.S. Cl. ................................................................ 502/74
[58] Field of Search ........................................ 502/66, 74

[56] References Cited

U.S. PATENT DOCUMENTS

| | | | |
|---|---|---|---|
| 3,745,112 | 7/1973 | Rausch | 208/139 |
| 4,329,258 | 5/1982 | Engelhard et al. | 208/139 |
| 4,430,517 | 2/1984 | Imai et al. | 585/660 |
| 4,448,891 | 5/1984 | Cohen | 502/74 |
| 4,478,706 | 10/1984 | Cohen | 208/138 |
| 4,552,856 | 11/1985 | Tauster et al. | 502/74 |
| 4,727,216 | 2/1988 | Miller | 585/660 |
| 4,987,109 | 1/1991 | Kao et al. | 502/66 |

OTHER PUBLICATIONS

Pujado et al, Production of LPG Olefins by Catalytic Dehydrogenation, vol. 4, No. 3, pp. 186–191, Energy Progress, Sep., 1984.

Atkins et al, Catalytic Dehydrogenation: A Review of Current Processes and Innovations, pp. 201–210, DGMK–Conference, Selective Hydrogenation and Dehydrogenation, on Nov. 11–12, 1993 in Kassel/Germany.

*Primary Examiner*—Michael Lewis
*Assistant Examiner*—Thomas G. Dunn, Jr.
*Attorney, Agent, or Firm*—Andrus, Sceales, Starke & Sawall

[57] ABSTRACT

A new catalyst for the selective conversion of isobutane to isobutylene. This catalyst also could be applied to the selective dehydrogenation of other light paraffins such as propane and n-butane. The catalyst is comprised of platinum, tin, and potassium supported on K—L-zeolite. This catalyst exhibits greater than 98% selectivity for conversion of isobutane to isobutylene at isobutane conversion levels greater than 50%. In addition, this catalyst exhibits excellent stability. The preferred catalyst would have an atomic ratio of Sn to Pt greater than 1.0 as well as an atomic ratio of K to Pt greater than 1.0.

13 Claims, 8 Drawing Sheets

CATALYST TO DEHYDROGENATE PARAFFIN HYDROCARBONS

CROSS-REFERENCE TO RELATED APPLICATIONS

This application is a continuation-in-part of application Ser. No. 08/410,230 filed Mar. 24, 1995, now abandoned.

STATEMENT REGARDING FEDERALLY SPONSORED RESEARCH OR DEVELOPMENT

This invention was made with United States Government support awarded by NSF Grant No.: CTS-9123197-MOD. 1. The United States Government has certain rights in this invention.

BACKGROUND OF THE INVENTION

Catalytic dehydrogenation processes are of increasing importance because of growing demand for olefins such as propylene and isobutylene. Isobutylene is in particularly high demand as a feedstock for the production of oxygenated compounds required in reformulated gasoline, such as methyl tert-butyl ether (MTBE), ethyl tert-butyl ether (ETBE), and tert-butyl alcohol (TBA). The Clean Air Act of 1990 has mandated the reformulation of gasoline to eliminate the formation of carbon monoxide by adding oxygenated compounds such as alcohols and ethers.

A promising route for producing isobutylene is (1) the extraction of the butane fraction from either natural gas or a refinery light end stream, (2) the isomerization of n-butane to isobutane, and (3) the dehydrogenation of isobutane to isobutylene. The isomerization of n-butane to isobutane step is not difficult because a very efficient bifunctional isomerization catalyst is available. However, the same cannot be said for the step involving dehydrogenation of isobutane (a light paraffin) to isobutylene (a light olefin). This is due to the fact that the dehydrogenation reaction is a highly endothermic reaction and requires high temperatures to achieve high conversion. Graph 1 shows the equilibrium conversions with increasing temperature for the different isobutane reactions at 12.5 Torr isobutane, 75 Torr hydrogen, and 760 Torr total pressure. It shows that temperatures greater than 773° K. are required for significant dehydrogenation conversion. A problem with these high temperatures is that other catalyzed reactions become significant, such as hydrogenolysis, isomerization, and coking. Specifically, the hydrogenolysis reaction produces lighter hydrocarbons such as methane, ethane, and propane; the isomerization reaction converts isobutane to n-butane; and the decomposition of isobutane results in coke. Accordingly at these higher temperatures one can see the reaction rates for hydrogenolysis, isomerization, and coking reactions are appreciable which decreases the olefin selectivity.

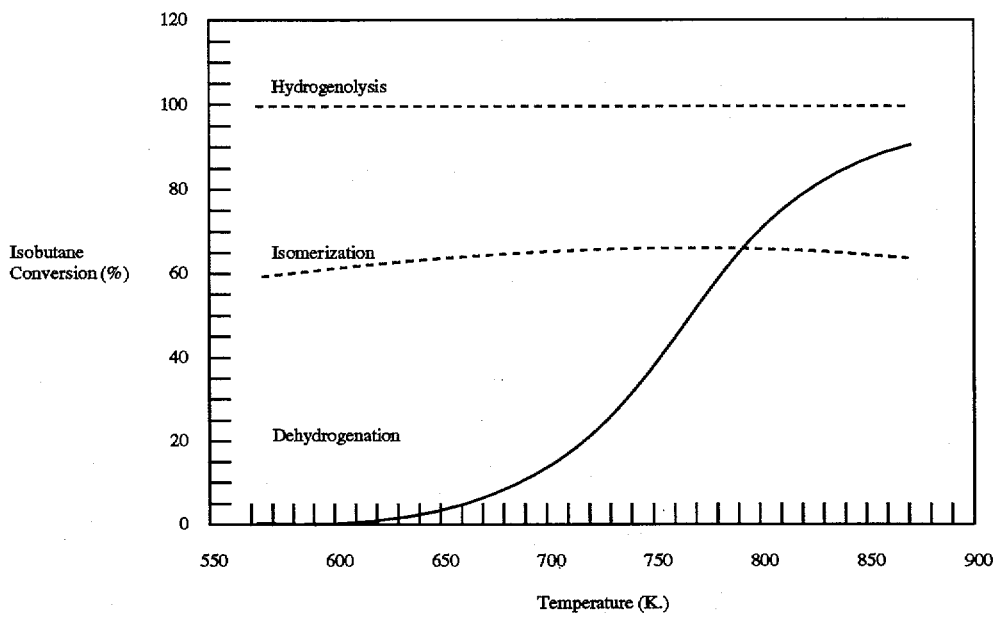

Graph 1

Thermodynamic equilibrium conversions at 12.5 Torr Isobutane, 75 Torr Hydrogen, and 673 Torr Helium.

Current commercial dehydrogenation units employ a chromia-alumina catalyst for the dehydrogenation of light alkanes. While these units exhibit reasonable dehydrogenation selectivity, the fixed catalyst beds deactivate quickly and must be regenerated. Thus, units must be operated in a cyclic mode that requires equipment and utilities for the frequent regenerations. Specifically, the reactors are operated on 20 minute cycles for purge, regeneration and reaction. Since the catalyst is based on promoted chromia-alumina, the disposal of the heavy metal chromium results in a great environmental concern.

Catalytic dehydrogenation over platinum-based catalysts offers a more attractive solution than the chromia-alumina catalysts in terms of catalyst stability. Modified supported platinum catalysts exhibit higher resistance to deactivation due to coking than chromia-alumina catalysts. This allows the design of dehydrogenation process units with lower utility requirements, high-capacity single reactor construction, low capital cost expenditures and flexibility for the processing of paraffins.

Although supported platinum is a good dehydrogenation catalyst and is advantageous over chromina-alumina catalysts, platinum does have its drawbacks. For instance, platinum also catalyzes the unwanted hydrogenolysis and isomerization reactions. The higher temperatures required to achieve high yields of isobutylene result in these competing reactions becoming significant and thereby lowering isobutylene selectivities.

Another problem with isobutane dehydrogenation is that even the best available supported platinum catalysts still deactivate rapidly due to the coke formation, though not as severely as chromina-alumina catalysts.

PRIOR ART

The literature has shown that the addition of tin to platinum on a neutralized support generates catalysts with enhanced selectivity for the dehydrogention of light paraffins, but these catalysts still exhibit isobutane selectivities less than 94%.

Brinkmeyer et al. (U.S. Pat. No. 4,866,211) showed that the catalyst consisting of Pt/Sn on non-acidic zinc aluminate spinel exhibited an isobutane dehydrogenation selectivity to isobutylene of 93.3% at an isobutane conversion of 50.4%.

Imai and Hung (U.S. Pat. No. 4,430,517) reported that a sulfided Pt/Sn/K/alumina catalyst exhibited an isobutane dehydrogenation selectivity to isobutylene of 93% at an isobutane conversion of 37%. Both a halogen and sulfur are required to modify the reactivity of this alumina-supported Pt/Sn catalyst for the dehydrogenation of light paraffins. The present invention does not require either a halogen or sulfur for the selective dehydrogenation of light paraffins.

Miller (U.S. Pat. No. 4,727,216) showed that the addition of tin to platinum supported in Ba—L-zeolite decreased the amount of isobutane hydrogenolysis, but this Pt/Sn/Ba—L catalyst required sulfiding to inhibit both hydrogenolysis and isomerization. Miller showed that upon sulfiding the Pt/Sn/Ba—L-zeolite catalyst exhibited a dehydrogenation selectivity of 92.5% at an isobutane conversion of 37%. Again, in the present invention, it was found that it is possible to prepare a catalyst containing platinum and tin in the potassium form of L-zeolite that is highly selective for isobutane dehydrogenation, without the necessity of sulfiding.

The present invention exhibits higher isobutane dehydrogenation selectivity than either the existing chromia-alumina and current platinum based technology. In addition, the present invention exhibits higher stability (thus requires less frequent regenerations) than the existing chromia-alumina technology and comparable stability to the current platinum based technologies.

BRIEF SUMMARY OF THE INVENTION

This invention relates to a new supported Platinum/Tin (Pt/Sn) catalyst that exhibits superior performance for the selective conversion of isobutane to isobutylene. At 873° K. this new catalyst exhibits greater than 98% selectivity for conversion of isobutane to isobutylene. The prior art achieves selectivities of only 93% and require the presence of either sulfur or a halogen. In addition, this novel catalyst exhibits excellent stability and also could be applied to the selective dehydrogenation of other light paraffins such as ethane, propane, and n-butane. Specifically, this catalyst is prepared by supporting tin and platinum in the potassium form of L-zeolite.

The process for producing the dehydrogenation catalyst comprises the steps of impregnating from 0.05% to 6.0% by weight of a Group IVA metal into a potassium-type L-zeolites to form a Group IVA metal-zeolite support, before adding any Group VIII metal and in the absence of any halide, and thereafter impregnating from 0.05% to 3.0% by weight of a Group VIII metal into the Group IVA-zeolite support to form a Group IIA-Group VIII-zeolite support. The Group IVA metals may be selected from tin, germanium and lead with tin being preferred. The Group VIII metal may be selected from platinum, nickel and palladium with platinum being preferred.

By impregnating the support with the Group IVA metal first prior to the impregnation of the Group VIII metal a superior catalyst is produced having both high activity and high selectivity. Activity is the number of moles of isobutane reacted per mole of available surface platinum. Selectivity is defined as the number of moles of desired product produced per mole of isobutane reacted. The inventors have found that reversing the impregnation procedure, i.e. adding the Group IVA metal (e.g. tin) after the impregnation of the Group VIII metal (e.g. platinum) produces a catalyst that exhibits high selectivity but lower activity compared to a catalyst prepared using the method of the present invention.

A catalyst prepared by laying down the Group IVA metal in the absence of a halide is superior in performance to a catalyst prepared with a halide. For example, the normal method of adding tin disclosed in the prior art is through the use of $SnCl_4$. However, adding tin as $SnCl_4$ introduces acidity to the catalyst and therefore creates a catalyst that causes undesirably high rates of isomerization, cracking and coking and thus exhibits lower selectivity, lower activity and lower stability. Impregnating the support with an organometallic tin compound such as tributyltinacetate cures such problems.

Each of the four components of the Pt/Sn/K—L-zeolite dehydrogenation catalyst is important in allowing this system to be highly selective and stable for isobutane dehydrogenation. Platinum catalyzes the removal of hydrogen from isobutane to produce isobutylene. The addition of tin reduces the size of the surface platinum ensembles and suppresses isomerization and hydrogenolysis reactions. The presence of potassium neutralizes the support, which inhibits the acid-catalyzed isomerization and coking reactions; moreover, potassium suppresses the competing isomerization and hydrogenolysis reactions, and enhances the dehydrogenation rate. The L-zeolite micropore structure stabilizes small Pt/Sn particles as well as enhances the dehydrogenation rate.

One advantage of this invention is that the catalyst allows the selective production of a specific olefin from the corresponding paraffin. This reaction specificity of this invention allows the production of light olefins from either light paraffins streams found in refineries or natural gas.

Another advantage of this invention is that this catalyst exhibits high stability and will require less frequent regenerations.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
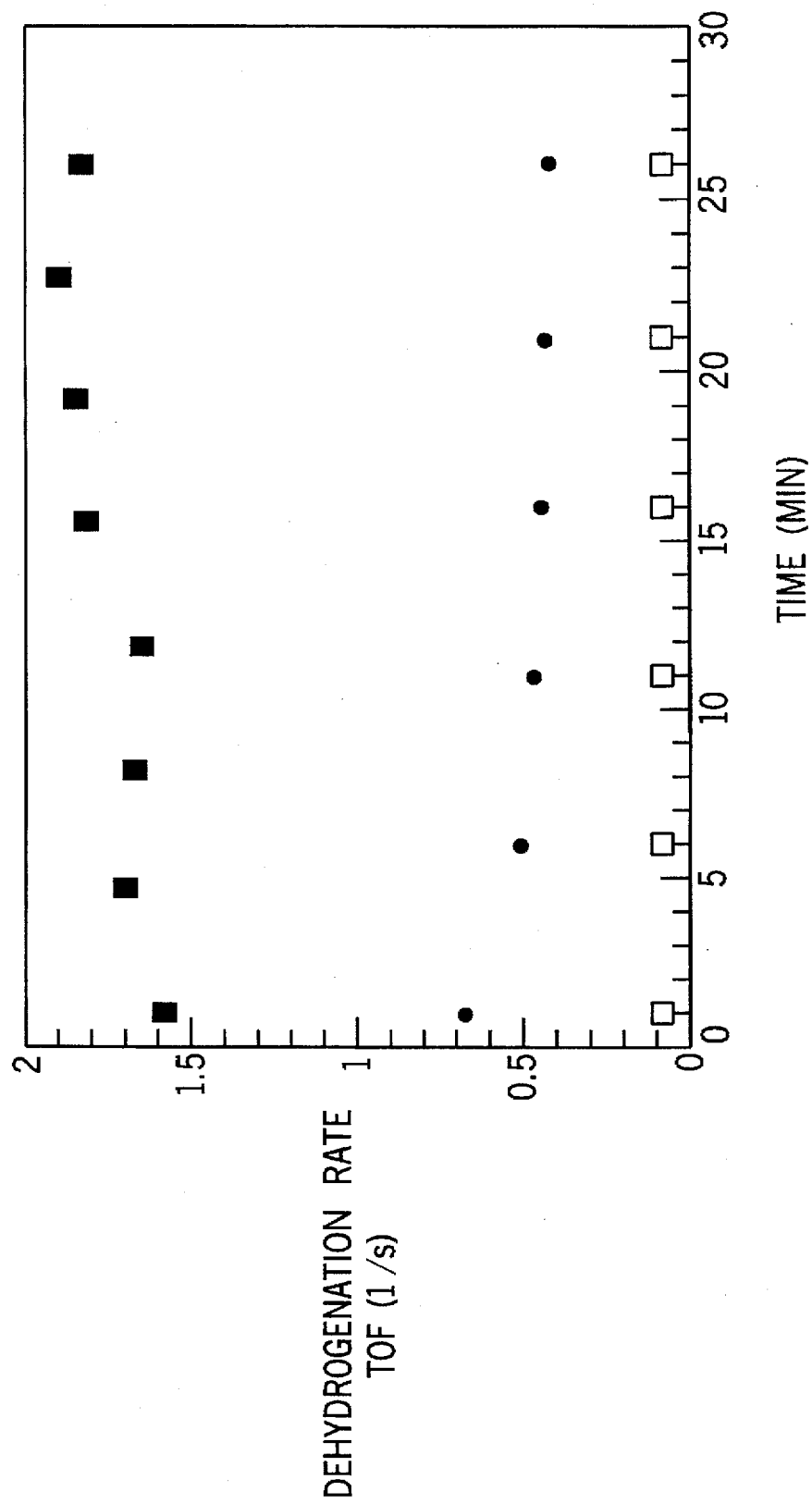
FIG. 1 is graph showing the isobutane dehydrogenation rate using various catalysts.

This new dehydrogenation catalyst has many applications. The preferred use of this novel catalyst is dehydrogenating isobutane to form isobutene. This catalyst preferably consists of supporting platinum, tin, and potassium on L-zeolite. Each of these four components is thought to be important in allowing this catalyst to be highly selective and stable for the dehydrogenation of light paraffins.

Supported platinum is a good dehydrogenation catalyst. Since the dehydrogenation of isobutane to isobutylene is an endothermic reaction, high temperatures are required to achieve high conversions. As previously stated, the rates of isomerization, hydrogenolysis, and coking reactions become significant at these higher temperatures and therefore the selectivity for dehydrogenation becomes low. Other VIII group metals can be used such as nickel, palladium, ruthenium, rhodium, or iridium, although platinum is preferred. Specifically, platinum and other group VIII metals should be present in a range of 0.05% to 3% by weight.

To counter the effect of side reactions, tin was added to the supported Pt catalyst to enhance the dehydrogenation selectivity of isobutane to isobutylene. The K—L-zeolite (Tosoh) was first calcined in dry air at 873° K. for 18 h, followed by incipient wetness impregnation with a solution of tributyltin acetate in methanol under a dry $N_2$ atmosphere. The tin can be in the following forms, although tributyl tin acetate is preferred:

Tributyl tin acetate
Trimethyltin
Tetra-n-propyltin
Tributyl tin hydride
Trimethyl tin hydroxide
Tri-n-propyltin hydroxide
Tri-n-propyltin acetate However, organometallic tin compounds that contain a halide or sulfur should be avoided. The addition of tin inhibits the competing isomerization, hydrogenolysis, and coking reactions.

Small platinum particles supported in porous L-zeolite are resistant to coke formation and, therefore further improvement of the resistence to coking during the dehydrogenation reaction is achieved by supporting small Pt/Sn ensembles in K—L-zeolite. In addition to being able to support small ensembles, the K—L-zeolite is a neutral support. Such a neutral support is required for the dehydrogenation system to prevent the formation of byproduct through acid-catalyzed reactions. L-zeolite is a synthetic zeolite and although preferred. Other neutralized zeolites, such as Y-zeolite, mordenite, and ZSM-5 will suffice.

The addition of potassium to the zeolite-supported Pt/Sn catalyst promotes the dehydrogenation reaction and improves the overall catalytic activity. The addition of potassium further inhibits the hydrogenolysis and isomerization reaction as well as provides further resistance to deactivation of the catalyst due to coking. Other Group IA metals can be used as well as potassium, although potassium is the preferred element.

The novel catalyst has an atomic ratio of Sn to Pt greater than 1.0. Between the temperatures of 400° C. and 600° C., the catalyst exhibits greater than 98% selectivity of isobutane to isobutylene with high dehydrogenation activity for its platinum content. It also exhibits good stability over this temperature range.

A myriad of paraffin hydrocarbons can be used in the present invention, including the preferred conversion of isobutane to isobutylene. However, the hydrocarbon for these catalysis would contain less than five carbons. Feedstocks for this catalyst would be propane, isobutane, and n-butane. These feedstocks could be separated from natural gas or a light ends stream in an oil refinery. Since, these small hydrocarbons act in a similar fashion and have the same catalytic surface with the same selectivity, this novel catalyst will also successfully dehydrogenate these compounds.

Catalyst Preparation

A 1.2 wt % $Pt/SiO_2$ catalyst was prepared by ion-exchange of Cab-O-Sil, using the method of Benesi et al., J. Catal, 10 (1968) 328. The extent of exchange was controlled by adjusting the pH of a $Pt(NH_3)_4(NO_3)_2$ and silica slurry with an aqueous, basic solution of $Pt/(NH_3)_4(OH)_2$. The resulting material was filtered, washed with deionized water, and dried overnight in air at 390° K. Tin was added to the 1.2 wt % $Pt/SiO_2$ catalyst by evaporative impregnation of a solution of tributyltin acetate in pentane. After impregnation with tin, the catalysts were dried overnight in air at 390° K., treated with flowing oxygen at 573K for 2 h, followed by reduction for 2 h in flowing hydrogen at 773° K. The Pt:Sn atomic ratio of the $Pt/Sn/SiO_2$ catalyst was 1:3.

A 1 wt % Pt/Ba—L-zeolite catalyst (provided by Dr. J. T. Miller of Amoco Oil Corporation) was prepared by impregnating $Pt(NH_3)_4(NO_3)_2$ into L-zeolite followed by drying at 393° K. and calcination at 523° K. The Ba—L-zeolite support was prepared from K—L-zeolite that was ion exchanged with a 0.5M solution of $Ba(NO_3)_2$ at 353° K. for 3 h and washed with 500 ml of cold deionized water, and dried and calcined at 773° K. for 3 h. Microcalorimetric studies indicated that this catalyst exhibited a saturation coverage for hydrogen adsorption of 20 μmol/g at 403° K.

Several Pt/Sn/K—L catalysts were prepared by the sequential impregnation of tin and platinum. These catalysts contained Pt:Sn atomic ratios of 1:3.5, 1:2.5, and 1:2.0. Examples 4, 6 and 8, respectively. The K—L-zeolite (Tosoh) was first calcined in dry air at 873° K. for 18 h, followed by incipient wetness impregnation with a solution of tributyltin acetate in methanol under a dry $N_2$ atmosphere. Following impregnation with tin, the zeolite was dried in air at 393° K. for 2 h and then treated in a flowing mixture of 25 mol % oxygen in helium at 573° K. The dried Sn/K—L-zeolite was impregnated with an aqueous solution of $Pt(NH_3)_4 (NO_3)_2$ (Aldrich) under a dry $N_2$ atmosphere, followed by heating in air at 393° K. for 2 h and treatment in flowing helium at 573° K. for 1 h. The resulting Pt/Sn/K—L catalysts were reduced in a flowing mixture of 10% hydrogen in helium at 773° K. for 6 h. The results of elemental analyses (Galbraith Laboratories, Inc.) of the supported Pt and Pt/Sn catalysts are shown in Table 1.

Excess potassium was added to the 1:2 Pt/Sn/K—L catalyst by incipient wetness impregnation with aqueous KOH (Aldrich) under a dry $N_2$ atmosphere. The impregnated catalyst was dried in air at 393° K. for 2 h and then reduced for 1 h at 773° K. in a flowing mixture of 10% hydrogen in helium. The Pt:Sn:K(excess) atomic ratios of this catalyst were 1:2:2, and this catalyst is designated as Pt/Sn/(K)/K—L.

EXAMPLE 1

Reaction kinetic studies of isobutane conversation were conducted using a stainless-steel apparatus and a quartz, down-flow reactor. Helium (Liquid Carbonic) was employed as a carrier gas, and it was purified by passage through copper turnings at 473° K., followed by activated molecular sieves (13X) at 77° K. Isobutane (Matheson, 99.5%) was treated by passage through a Deoxo unit (Engelhard) and a bed of molecular sieves (13X) at 77° K. The reactor inlet and outlet gases were analyzed by a HP-5890 gas chromatograph with FID detector and a 10 foot 15% Squalane Chromosorb PAW column at 323° K.

RESULTS

Initial isobutane reactivities were measured over all catalysts at 673° K., 12.5 Torr of isobutane, 75 Torr of hydrogen and a total pressure of 760 Torr. The catalysts were first reduced with hydrogen at 773° K. for 1 h and then cooled to 673° K. before kinetic data were collected. The equilibrium conversion of isobutane to isobutylene is 7.0% at these conditions. The results of these measurements are summarized in Table 2. The turnover frequencies are based on the number of surface platinum atoms determined from saturation hydrogen uptakes at 403° K., as reported in Table 3. This table also presents saturation uptakes of carbon monoxide at 403° K.

TABLE 1

Compositions of $Pt/SiO_2$, $Pt/Sn/SiO_2$, and Pt/Sn/K—L-zeolite catalysts

| Catalyst Label | Pt Loading wt % | Sn Loading wt % | Pt/Sn Atomic Ratio |
|---|---|---|---|
| $Pt/SiO_2$ | 1.2 | — | 1:0:0 |
| 1:3 $Pt/Sn/SiO_2$ | 1.2 | 2.1 | 1:2.8:0 |
| 1:2 Pt/Sn/L-zeolite | 0.58 | 0.74 | 1:2* |
| 1:2.5 Pt/Sn/L-zeolite | 0.44 | 0.66 | 1:2.5** |
| 1:3.5 Pt/Sn/L-zeolite | 0.55 | 1.17 | 1:35*** |

*Example 8
**Example 6
***Example 4

TABLE 2

Isobutane reactivity at 673 K, 12.5 Torr isobutane, 75 Torr hydrogen and 760 Torr total pressure

| Catalyst | 1.2 wt % Pt/Silica | 1:3 Pt/Sn/Silcia | Pt Bn—L | Pt/Sn/L 1:2 | Pt/Sn/L 1:2.5 | Pt/Sn/K—L 1:3.5 | Pt/Sn/K/L 1:2:2 |
|---|---|---|---|---|---|---|---|
| WHSV$^a$ (h$^{-1}$) | 6.5 | 3.8 | 24.9 | 3.88 | 3.88 | 8.2 | 3.88 |
| Isobutane Conversion (%) | 19.0 | 4.2 | 22.5 | 5.3 | 6.4 | 3.0 | 6.9 |
| Isobutane Conversion TOF$^b$ | 0.080 | 0.043 | 0.64 | 0.14 | 0.17 | 0.17 | 0.11 |
| $CH_4$ TOF$^b$ | 0.041 | 0.00052 | 0.45 | 0.017 | 0.013 | 0.0014 | 0.00014 |
| $C_2H_6$ TOF$^b$ | 0.014 | 0.00013 | 0.10 | 0.00025 | 0.00033 | 0 | 0 |
| $C_3H_8$ TOF$^b$ | 0.026 | 0.00045 | 0.31 | 0.016 | 0.012 | 0.0037 | 0.0013 |
| $n-C_4H_{10}$ TOF$^b$ | 0.028 | 0.00035 | 0.16 | 0.00065 | 0 | 0 | 0 |
| $i-C_4H_8$ Selectivity$^c$ (%) | 19.5 | 97.9 | 14.1 | 87.9 | 92.6 | 98.2 | 99.1 |

$^a$WHSV = (g isobutane/h)/(g catalyst)
$^b$TOF = (molecules of product)/(molecules of surface Pt) (sec)
$^c$selectivity = (100 × moles of product)/(moles of isobutane reacted)

TABLE 3

Hydrogen and carbon monoxide saturation uptakes at 403 K

| Catalyst | wt % Pt | Coverage $H_2$ | (μmol/g) CO |
|---|---|---|---|
| Pt/SiO$_2$ | 1.2 | 37 ± 2 | 46 ± 2 |
| 1:3 Pt/Sn/SiO$_2$ | 1.2 | 9 ± 1 | 11 ± 1 |
| 1:2 Pt/Sn/K—L | 0.58 | 3.5 ± 0.5 | 9.0 ± 0.5 |
| 1:3.5 Pt/Sn/K—L | 0.55 | 3.5 ± 0.5 | 8.5 ± 0.5 |
| 1:1.7:2 Pt/Sn(K)/K—L | 0.58 | 6.0 ± 0.5 | 9.0 ± 0.5 |

It can be seen in Table 2 that the Pt/Ba—L catalyst exhibits significantly higher activity for isobutane conversion compared to the Pt/SiO$_2$ catalyst. Specifically, the Pt/Ba—L, catalyst exhibits turnover frequencies for conversion of isobutane and for production of methane, ethane, propane, and n-butane that are an order of magnitude higher than the Pt/SiO$_2$ catalyst. The Pt/Sn/K—L catalysts exhibit significantly lower turnover frequencies for the conversion of isobutane and for production of methane, ethane, propane, and n-butane than the Pt/Ba—L catalyst. Specifically, the hydrogenolysis and isomerization reaction rates decrease with increasing tin content of the Pt/Sn/K—L catalysts, and the isobutane conversion is limited over these Pt/Sn/K—L catalysts by the equilibrium conversion of isobutane to isobutylene. The addition of Sn to Pt/SiO$_2$ suppresses the production of methane, ethane, propane, and n-butane. The suppression of isomerization and hydrogenolysis reactions over the Pt/Sn/K—L catalysts leads to an enhancement in the selectivity for isobutane dehydrogenation to isobutylene. Moreover, the addition of excess potassium to the 1:2 Pt/Sn/K—L catalyst leads to a further decrease in the isomerization and hydrogenolysis rates and a corresponding enhancement in the dehydrogenation selectivity.

Isobutane dehydrogenation rates were measured over selected catalysts under conditions chosen to insure that these rates were not influenced by equilibrium or transport limitations. In particular, these measurements were conducted at 723° K., 12.5 Torr of isobutane, 75 Torr of hydrogen, and a total pressure of 760 Torr over sieved catalyst fractions (80–120 mesh) mixed with Cab-O-Sil at a dilution ratio greater than 19:1. Isobutane conversions were maintained less than 10% of the equilibrium dehydrogenation conversion of 24.5%. FIG. 1 shows that the 1:3.5 Pt/Sn/K—L catalyst is over 2 times more active for isobutane dehydrogenation than 1.2 wt % Pt/SiO$_2$ and 40 times more active than 1:3 Pt/Sn/SiO$_2$. The Pt/SiO$_2$ catalyst exhibited an initial dehydrogenation selectivity of 80% at the low conversions of this study, while the Pt/Sn catalysts exhibited dehydrogenation selectivities greater than 99%.

Figure 2:
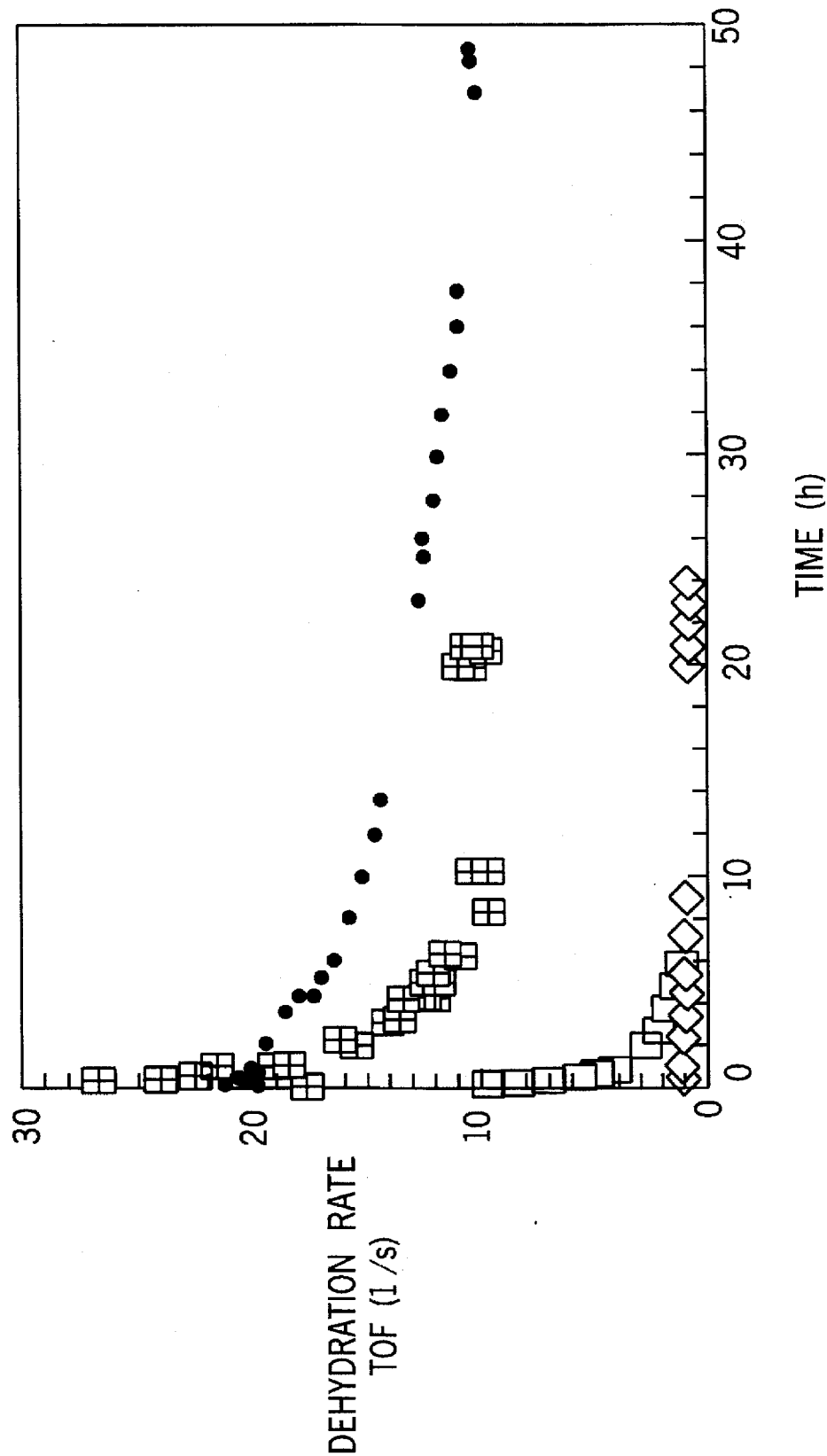
FIG. 2 is a graph showing catalyst activity at reaction conditions conducive to coking.
Figure 3:
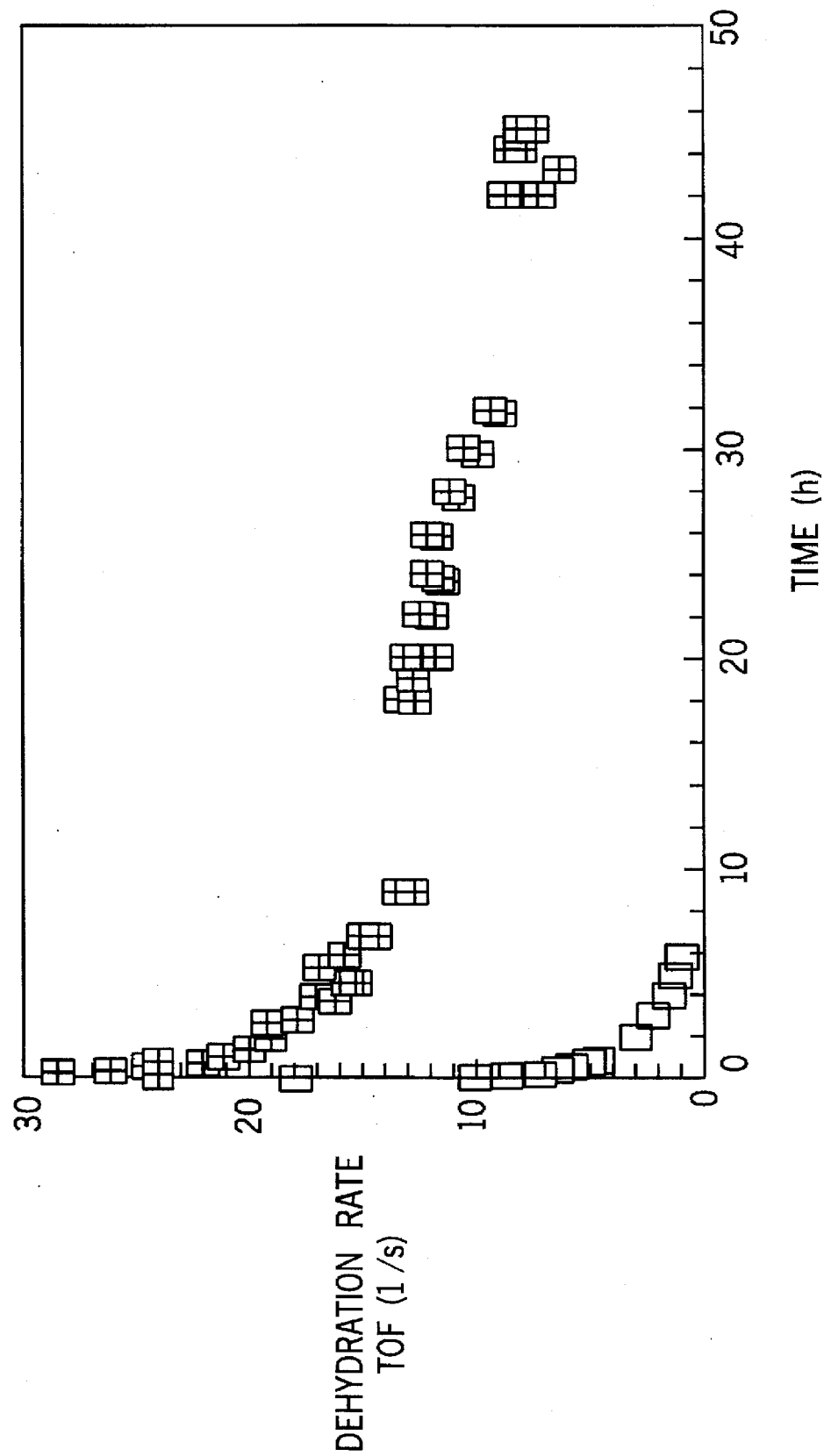
FIG. 3 is a graph showing isobutane dehydrogenation.

FIG. 2 presents turnover frequencies for the production of isobutylene at 773° K., 109 Torr of isobutane and 651 Torr of helium (i.e., without hydrogen in the feed) over sieved and diluted catalyst fractions. Isobutane conversions were maintained less than 10% of the equilibrium dehydrogenation conversion of 60%. The dehydrogenation selectivities were greater than 99% over all Pt/Sn-based catalysts investigated at the low conversions of this study. This figure shows that the 1:3 Pt/Sn/SiO$_2$ catalyst exhibits the lower dehydrogenation activity. The 1:2 Pt/Sn/K—L catalyst exhibits an initially high dehydrogenation turnover frequency of 18 s$^{-1}$, but it deactivates to the activity of the 1:3 Pt/Sn/K—L catalysts. The 1:2.5 Pt/S—/K—L and 1:3:5 Pt/S—/K—L catalysts exhibit higher initial dehydrogenation rates than the 1:2 Pt/Sn/K—L catalyst, and the dehydrogenation rates over these catalyst decrease moderately over time. Importantly, the 1:2.5 Pt/Sn/K—L and 1:3.5 Pt/Sn/K—L catalysts exhibit high dehydrogenation turnover frequencies after long periods of time on stream. FIG. 3 shows that the addition of excess potassium to the 1:2 Pt/Sn/K—L catalyst increases the dehydrogenation rate and increases the resistance of the catalyst to deactivation.

Activation energies and kinetic orders for isobutane dehydrogenation were determined over sieved and diluted 1.2 wt % Pt/SiO$_2$ 1:3 Pt/Sn/SiO$_2$, and 1:3.5 Pt/Sn/K—L catalysts. All data were collect at dehydrogenation conversions less than 15% of the equilibrium values. Table 4 shows the apparent activation energies for isobutane dehydrogenation determined at temperatures between 673° and 773° K., and at 12.5 Torr isobutane, 75 Torr hydrogen, and a total pressure of 760 Torr. Table 5 lists the hydrogen reaction orders determined at various temperatures and hydrogen pressures for the catalysts at an isobutane pressure of 12.5 Torr. The isobutane dehydrogenation reaction was first order with respect to isobutane pressure overall catalysts at a hydrogen pressure of 75 torr and over a range of isobutane pressures between 5 Torr and 100 Torr.

TABLE 4

Activation energies for isobutane dehydrogenation:
Reaction conditions: 12.5 Torr isobutane pressure,
75 Torr hydrogen pressure, and total pressure of 760 Torr

| Catalyst | Dehydrogenation Ea (kJ/mol) |
|---|---|
| 1.2 wt % Pt/SiO$_2$ | 44 |
| 1:3 Pt/Sn/SiO$_2$ (1.2 wt % Pt) | 76 |
| 1:3.5 Pt/Sn/K—L (0.55 wt % Pt) | 81 |

TABLE 5

Hydrogen orders at 12.5 Torr isobutane pressure

| Catalyst | Temperature (K) | Pressure Range (Torr) | Hydrogen Order |
|---|---|---|---|
| 1.2 wt % Pt/SiO$_2$ | 723 | 25–350 | 0.0 |
|  | 673 | 25–75 | −0.1 |
|  | 673 | 75–350 | −0.5 |
| 1:3 Pt/Sn/SiO$_2$ (1.2 wt % Pt) | 673 | 25–75 | −0.5 |
|  | 673 | 75–600 | −0.1 |
|  | 723 | 25–75 | −0.2 |
|  | 723 | 75–600 | −0.6 |
|  | 773 | 25–75 | −0.1 |
|  | 773 | 75–600 | −0.4 |
| 1:3.5 Pt/Sn/K—L (0.55 wt % Pt) | 723 | 25–75 | −0.4 |
|  | 723 | 75–600 | −0.7 |
|  | 773 | 25–75 | −0.5 |
|  | 773 | 75–600 | −0.8 |

EXAMPLE 2

Mössbauer spectra of $^{119}$Sn were collected using an Austin Science Associates Model S-600 Mössbauer spectrometer, connected to a microcomputer with a PCAII data collection board. The spectrometer was operated in the constant-acceleration mode, with a 10-mCi single-line gamma-ray source of Ca$^{119m}$SnO$_3$ (Amarsham). Detection of the 23.88 keV -rays was achieved with a Xe—CO$_2$ proportional counter. A 0.05 mm thick Pd foil was placed between the source and detector to filter 25.04 and 25.27 keV X-rays from the source. A mixture of $BaSnO_3$ and β-tin powder was used to calibrate the magnitude and linearity of the Doppler velocity drive. Chemical shifts are reported relative to $BaSnO_3$ at room temperature.

RESULTS

Figure 4A:
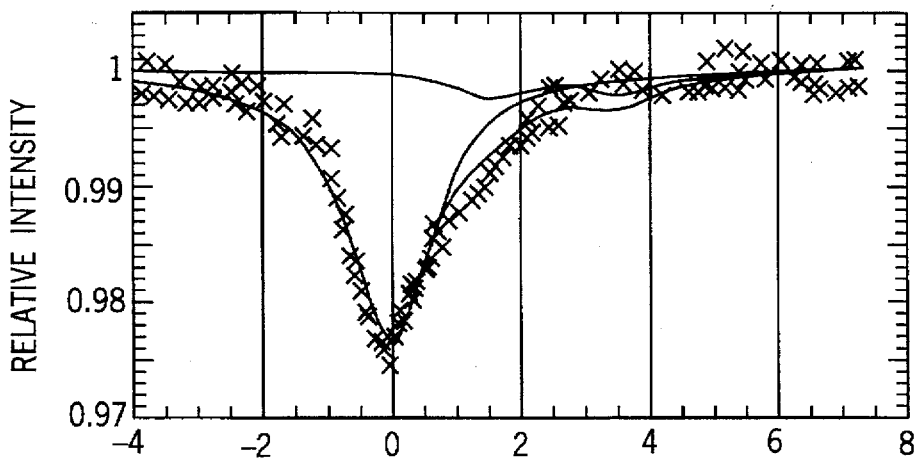
FIGS. 4.(a)–(c) are graphs showing Mössbauer spectroscopic results.
Figure 4B:
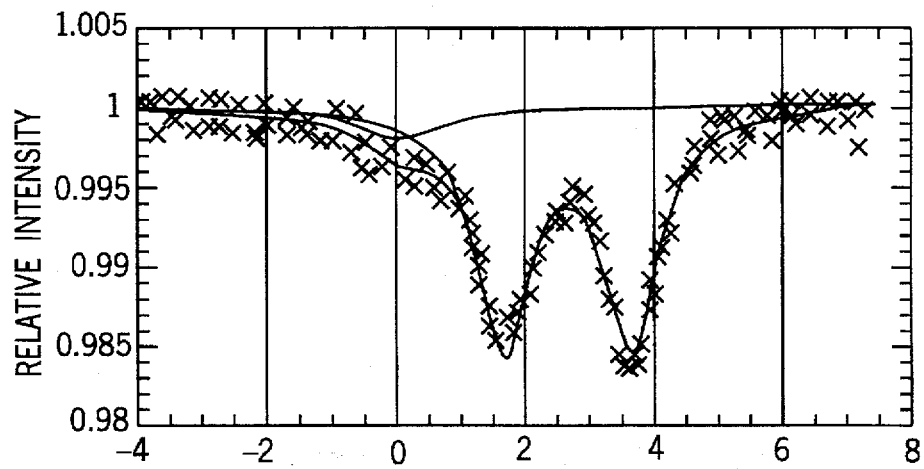

Mössbauer spectra were collected over a 1% Sn/K—L catalyst after oxidation and reduction steps. After drying overnight at 393° K., the Sn/K—L catalyst was treated in a glass Mössbauer spectroscopy cell with a flowing mixture of 25 vol % oxygen in helium at 573° K. for 1 h. FIG. 4(a) shows the Mössbauer spectrum of this oxidized Sn/K—L catalyst collected at room temperature. The spectrum can be fit with a large singlet attributed to the presence of $Sn^{4+}$ and a small doublet attributed to $Sn^{2+}$. Table 6 lists the Mössbauer parameters of these $Sn^{4+}$ and $Sn^{2+}$ species. The oxidized Sn/K—L sample was subsequently treated in flowing hydrogen at 773° K. for 6 h. The spectrum of this reduced Sn/K—L catalyst, presented in FIG. 4(b), shows a significant $Sn^{2+}$ doublet and a small $Sn^{4+}$ singlet. Table 6 shows that the relative spectral area of the $Sn^{2+}$ doublet increased from 8 to 91% after the 6 h treatment in $H_2$. This table also shows for comparison the Mössbauer parameters for SnO and tin supported on silica after reduction with hydrogen.

TABLE 6

Mössbauer spectra parameters at 298 K

| Material | Treatment | Isomer Shift (mm/s) | Quadropole Splitting (mm/s) | Relative Area (%) | Species |
| --- | --- | --- | --- | --- | --- |
| SnO | | 2.68 | 1.33 | | |
| Sn/SiO$_2$ | H$_2$ Reduction | 2.99 | 2.29 | | Sn$^{2+}$ |
| 1% Sn/ K—L | O$_2$ Treatment 573 K-1 h | 2.62 −0.04 | 1.99 — | 8 92 | Sn$^{2+}$ Sn$^{4+}$ |
| 1% Sn/ K—L | H$_2$ Reduction 773 K-6 h | 2.62 0.00 | 1.99 — | 91 9 | Sn$^{2+}$ Sn$^{4+}$ |
| 1:3.5 Pt/Sn K—L | H$_2$ Reduction 773 K-8 h | 2.62 2.29 | 1.99 — | 81 19 | Sn$^{2+}$ Pt/Sn alloy |

EXAMPLE 3

Differential enthalpy changes of hydrogen and carbon monoxide adsorption at 403° K. were measured using a Setaram C80 heat flux microcalorimeter. Values of the differential enthalpy changes of adsorption, $\Delta H_{ads}$ are negative, and it is convenient to define the heat of adsorption as being equal to $-\Delta H_{ads}$. A detailed description of the calorimeter apparatus can be found elsewhere. Hydrogen (Liquid Carbonic) was purified for these measurements by passage through a Deoxo unit (Engelhard), followed by molecular sieves (Davison) at 77° K. Carbon monoxide (Matheson 99.9%) was purified by passage through a heated trap (573° K.) packed with quartz wool and dried by passage through molecular sieves at 77° K.

RESULTS

Catalyst samples were pretreated for microcalorimetric studies by heating in the calorimeter cell under vacuum over a period of 3 h to 673K, followed by evacuation of this temperature for 1 h. After cooling the cell to room temperature, 500 Torr of $H_2$ was admitted into the system, and the cell was heated to 723° K. over a period of 3 h and then held at this temperature for 2 h to reduce the catalyst. The gas in the cell was evacuated and replaced with fresh hydrogen several times during these reduction steps. Following reduction, the catalyst was outgassed at 673° K. for 2 h. The calorimeter thermal block was subsequently raised around the cells, and the system was allowed to equilibrate overnight at 403° K.

Figure 5A:
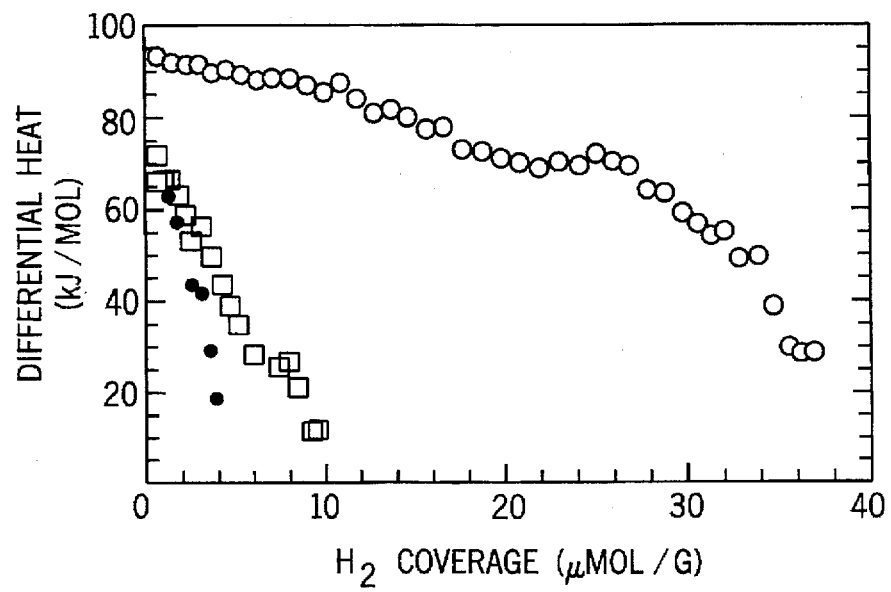
FIG. 5(a) is a graph showing differential heat with $H_2$ coverage.
Figure 5B:
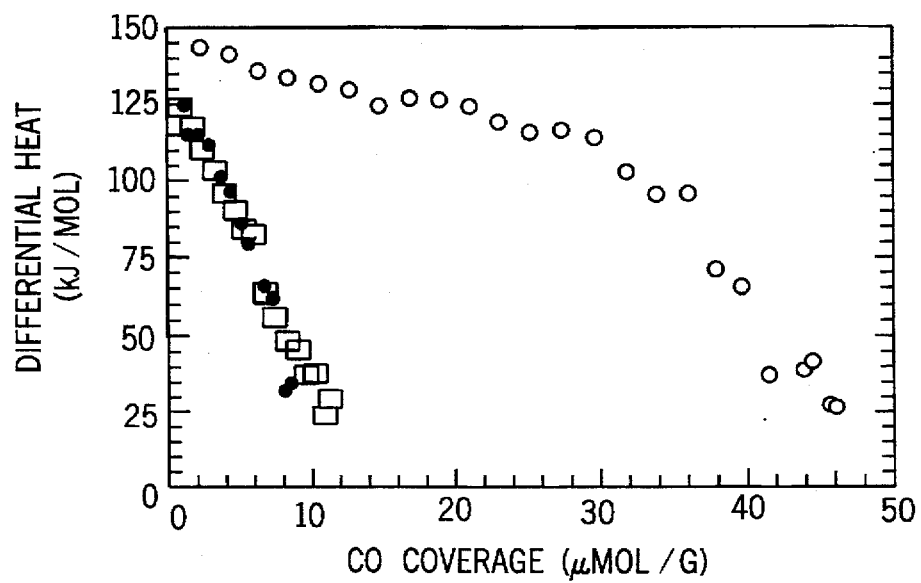
FIG. 5(b) is a graph showing differential heat with CO coverage.

FIG. 5 shows plots of differential heat versus adsorbate coverage for hydrogen and carbon monoxide adsorption on 1.2 wt % Pt/SiO$_2$, 1:3 Pt/Sn/SiO$_2$, and 1:3.5 Pt/Sn/K—L catalysts. The initial heats for adsorption of hydrogen and carbon monoxide on Pt/SiO$_2$ are in agreement with values reported by others for Pt supported on silica and neutralized zeolites. Earlier investigations reported values of 92 and 140 kJ/mol on Pt at 403° K. for the initial heats for hydrogen and carbon monoxide adsorption, respectively. It can be seen in FIG. 5 that the initial heats and saturation coverages for hydrogen and carbon monoxide adsorption are significantly lower over the 1:3 Pt/Sn/SiO$_2$ and 1:3.5 Pt/Sn/K—L catalysts compared to 1.2 wt % Pt/SiO$_2$. For example, the initial heats for hydrogen and carbon monoxide adsorption over 1:3.5 Pt/Sn/K—L are equal to 63 and 126 kJ/mol, respectively.

EXAMPLE 4

A catalyst was prepared by calcining a potassium-type-L zeolite at 873° K.; impregnating the catalyst with 1.2 wt % tin using tributyltinacetate in methanol; drying the catalyst at 120° C.; calcining the catalyst at 573° K.; impregnating the catalyst with 0.55 wt % platinum using tetrammineplatinum (II) nitrate; drying the catalyst; treating the catalyst with helium at 573° K.; and reducing the catalyst in hydrogen at 873° K.

EXAMPLE 5

Figure 6A:
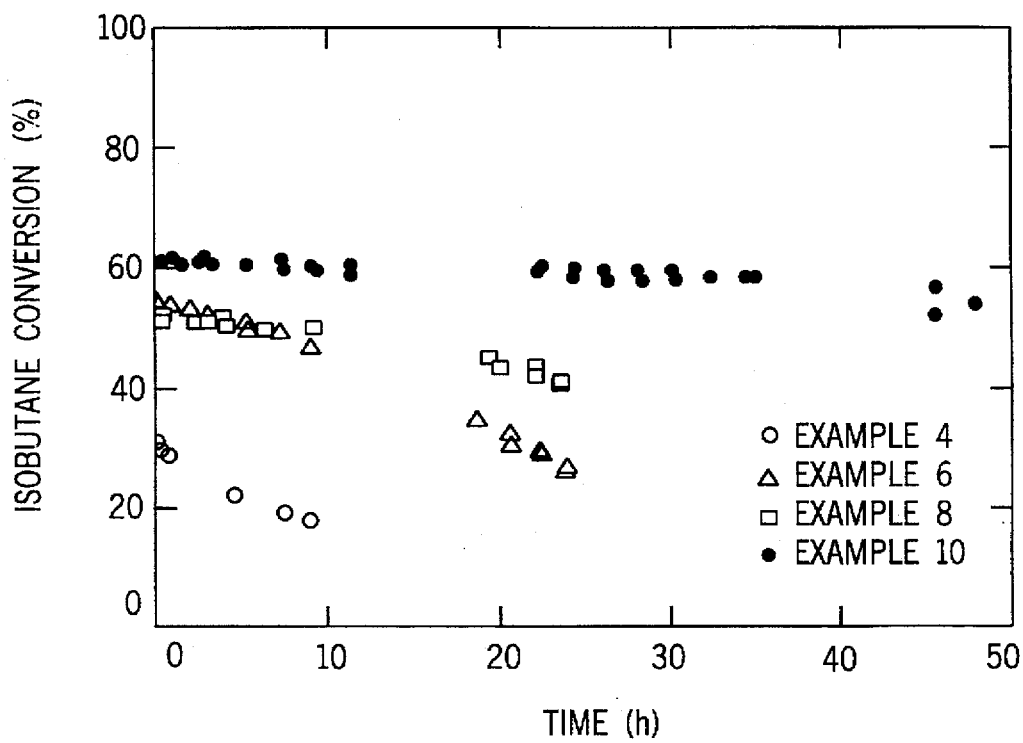
FIG. 6(a) is a graph illustrating the conversion of isobutane to isobutylene.
Figure 6B:
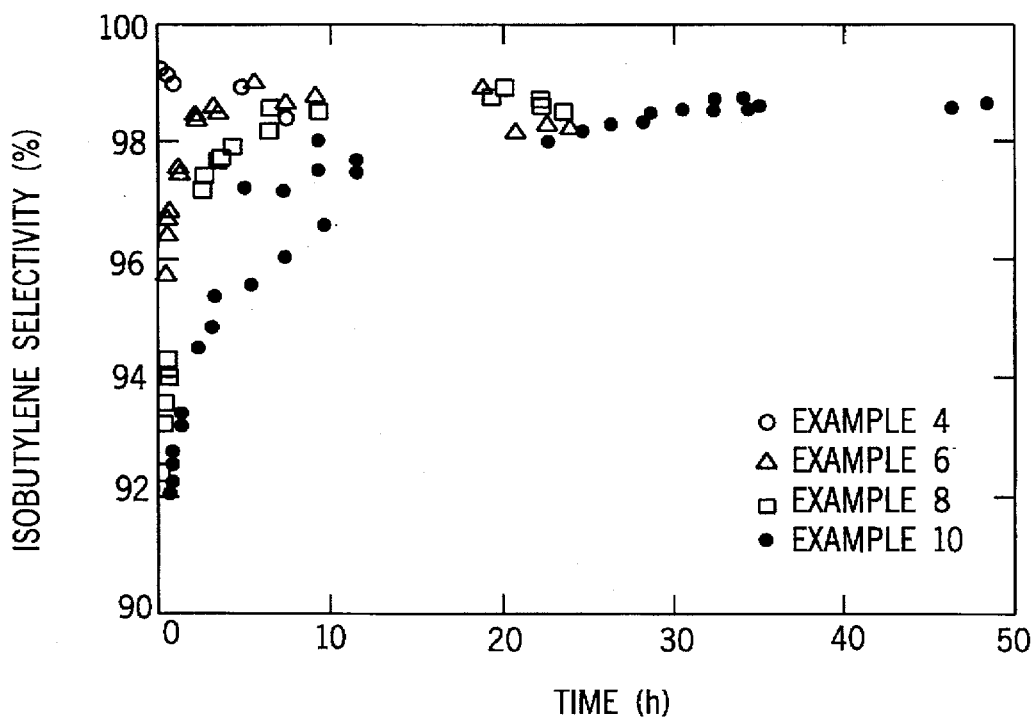
FIG. 6(b) is a graph illustrating the selectivity for conversion to isobutylene.

The catalyst of Example 4 was loaded into a stainless steel reactor, reduced for 1 hour at 873° K. in flowing hydrogen, and used to convert isobutane at 873° K., 1 atm, 13 WHSV, and 2 H$_2$/HC. Table 7 shows the composition of the inlet hydrocarbon stream. FIGS. 6 and 7 show this catalyst initially converted 30.7% of the isobutane with a dehydrogenation selectivity of 99.2%. After 9 h of operation the activity of the catalyst decreased with an isobutane conversion was 17.7%. The dehydrogenation selectivity at this conversion was 97.9%.

TABLE 7

| Inlet Hydrocarbon | Mole % |
| --- | --- |
| C3 | 0.26 |
| iC4 | 99.50 |
| nC4 | 0.24 |

EXAMPLE 6

A catalyst was prepared by calcining a potassium-type-L-zeolite at 873° K.; impregnating the catalyst with 0.66 wt % tin using tributyltinacetae in methanol; drying the catalyst at 393° K.; calcining the catalyst at 573° K.; impregnating the catalyst with 0.44 wt % platinum using tetrammineplatinum (II) nitrate; drying the catalyst; treating the catalyst with helium at 573° K.; and reducing the catalyst in hydrogen at 873° K.

EXAMPLE 7

The catalyst of Example 6 was loaded into a stainless steel reactor, reduced for 1 hour at 873° K. in flowing hydrogen, and used to convert isobutane at 873° K., 1 atm, 13 WHSV, and 2 H$_2$/HC. FIGS. 6 and 7 show this catalyst initially converted 55.1% of the isobutane with a dehydrogenation selectivity of 95.7%. After 24 h of operation the activity of the catalyst decreased with an isobutane conversion was 27.2%. The dehydrogenation selectivity at this conversion was 98.2%.

EXAMPLE 8

A catalyst was prepared by calcining a potassium-type-L-zeolite at 873° K.; impregnating the catalyst with 0.74 wt % tin using tributyltinacetate in methanol; drying the catalyst at 393° K.; calcining the catalyst at 573° K.; impregnating the catalyst with 0.58 wt % platinum using tetrammineplatinum (II) nitrate; drying the catalyst; treating the catalyst with helium 573° K.; and reducing the catalyst in hydrogen at 873° K.

EXAMPLE 9

The catalyst of Example 8 was loaded into a stainless steel reactor, reduced for 1 hour at 873° K. in flowing hydrogen, and used to convert isobutane at 873° K., 1 atm, 13 WHSV, and 2 H$_2$/HC. FIGS. 6 and 7 show this catalyst initially converted 52.5% of the isobutane with a dehydrogenation selectivity of 92.4%. After 24 h of operation the activity of the catalyst decreased with an isobutane conversion was 42.0%. The dehydrogenation selectivity at this conversion was 98.5%.

EXAMPLE 10

A catalyst was prepared by (1) calcining a potassium-type L-zeolite at 873° K.; (2) impregnating the catalyst with 0.57 wt % tin using tributyltinacetate in methanol; (3) drying the catalyst at 393° K.; (4) calcining the catalyst at 573° K.; (5) impregnating the catalyst with 0.55 wt % platinum using tetrammineplatinum (II) nitrate; (6) drying the catalyst; (7) treating the catalyst with a mixture of 10% oxygen in helium at 533° K.; and (8) reducing the catalyst in hydrogen at 873° K.

It must be understood that the interactions of the components of a catalyst are dependent on the preparation method, and catalysts with similar compositions will have different catalytic properties depending on the preparation technique. These differences in catalytic properties are attributed to the fact that the components are interacting on the surface to produce different type of catalytic sites.

In particular, if the methods of the Cohen (U.S. Pat. No. 4,448,891) and Imai et al (U.S. Pat. No. 4,430,517) references are combined, the resulting catalyst would not be selective and probably would not be very active. Cohen catalyst has no tin, and in our laboratory a similar preparation (Pt on the potassium form of L-zeolite) exhibits extremely poor selectivity. As shown in Table 8 below, catalysts prepared without tin show very low selectivity (see the first two columns of Table 8) i.e. 19.5% and 34.2%. In contrast, catalysts prepared with tin in accordance with the present invention (see the third and fourth columns of Table 8) show very high selectivity, i.e. 98.2% and 99.1%. The data in Table 8 clearly demonstrate tin is required to produce a catalyst having high selectivity.

TABLE 8

Isobutane reactivity at 673 K, 12.5 Torr isobutane, 75 Torr hydrogen and 760 Torr total pressure.

| Catalyst | 1.2 wt % Pt5/Silica | 0.5 wt % Pt/K—L | Pt/Sn/K—L 1:3.5 | Pt/Sn/K/L 1:2:2 |
|---|---|---|---|---|
| WHSV$^a$ (h$^{-1}$) | 6.5 | 7.0 | 8.2 | 3.88 |
| Isobutane Conversion (%) | 19.0 | 16.1 | 3.0 | 6.9 |
| Isobutane Conversion TOF$^b$ | 0.080 | 0.240 | 0.17 | 0.11 |
| CH$_4$TOF$^b$ | 0.041 | 0.142 | 0.0014 | 0.00014 |
| C$_2$H$_6$TOF$^b$ | 0.014 | 0.033 | 0 | 0 |
| C$_3$H$_8$TOF$^b$ | 0.026 | 0.088 | 0.0037 | 0.0013 |
| n-C$_4$H$_{10}$TOF$^b$ | 0.028 | 0.040 | 0 | 0 |
| i-C$_4$H$_8$ Selectivity$^c$ (%) | 19.5 | 34.2 | 98.2 | 99.1 |

$^a$WHSV = (g isobutane/h)/(g catalyst)
$^b$TOF = (molecules of product)/(molecules of surface Pt) (sec)
$^c$selectivity = (100 × moles of product)/(moles of isobutane reacted)

Figure 7A:
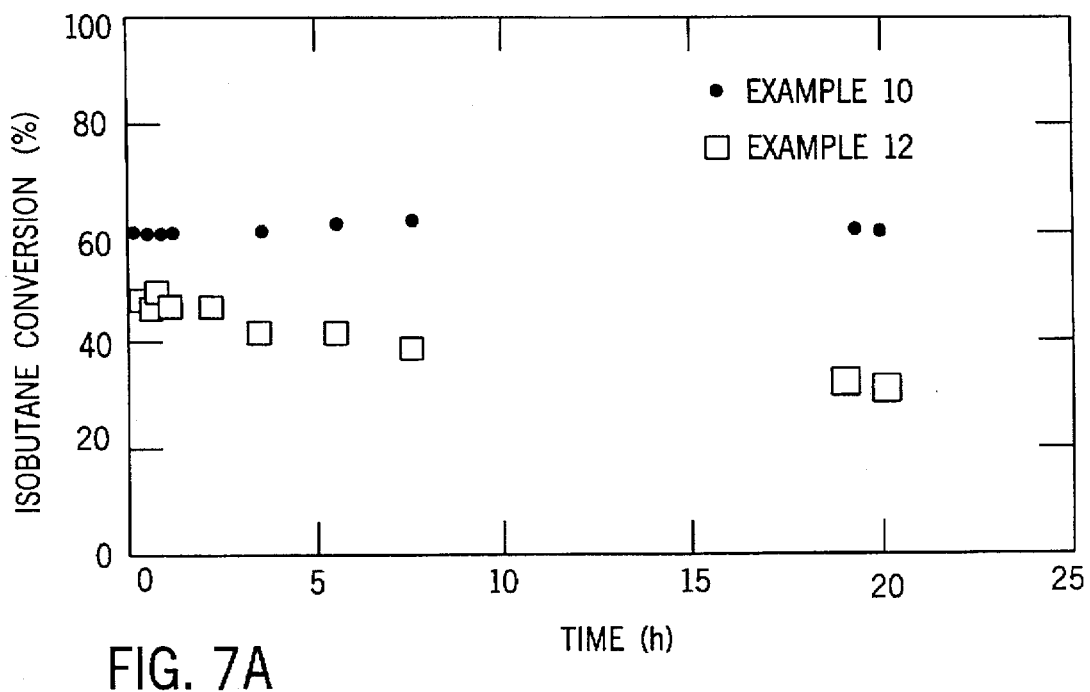
FIG. 7(a) is a graph illustrating the conversion of isobutane to isobutylene of a catalyst prepared in the absence of a halide using tributyltinacetate, and a catalyst prepared in the presence of a halide using $SnCl_4$.
Figure 7B:
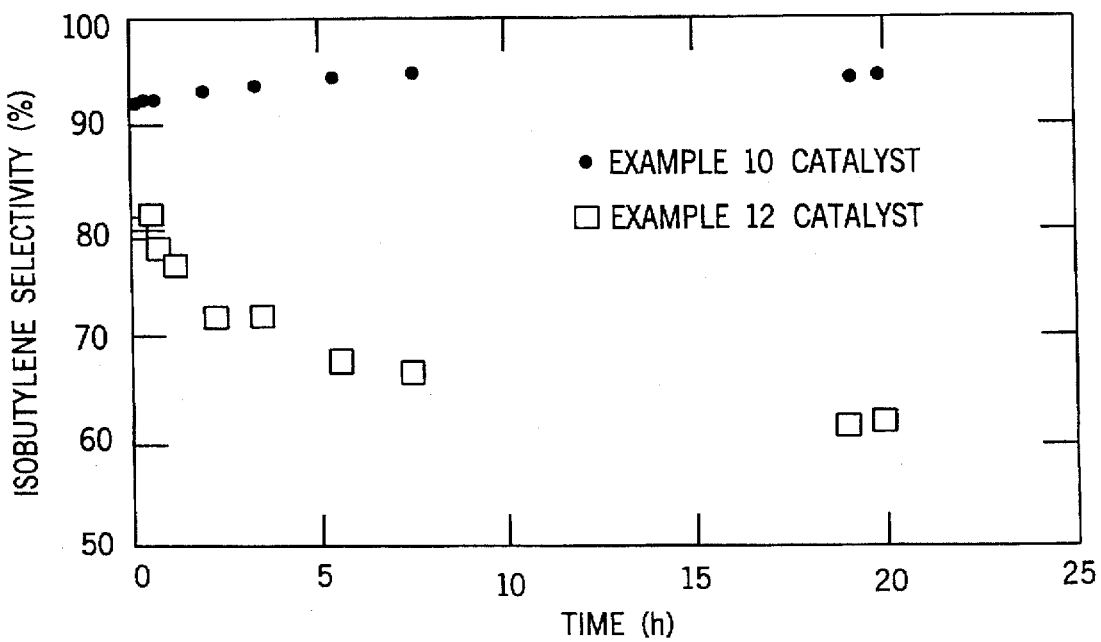
FIG. 7(b) is a graph illustrating the selectivity for conversion to isobutylene of the same two catalysts of FIG. 7(a)

The normal method of adding tin is through the use of SnCl$_4$ as is mentioned in the Imai et al patent. However, adding tin as SnCl$_4$ introduces acidity to the catalyst and, therefore, creates a catalyst that causes high rates of isomerization, cracking and coking and thus exhibits lower selectivity, lower activity, and lower stability as shown in FIGS. 7(a) and 7(b). FIGS. 7(a) and 7(b) compare the performance of Pt/Sn/K—L-zeolite catalysts that were prepared with similar loadings of platinum and tin. The catalyst of Example 12 was prepared using SnCl$_4$ (in accordance with the Imai et al patent) instead of tributyltinacetate (in accordance with the present invention) used in the catalyst of Example 10. The results clearly demonstrate that a catalyst prepared with tin in the absence of a halide is superior in performance to one prepared with a halide. The catalyst of the present invention (Example 10) had a selectivity of 98.0% whereas the catalyst of Imai et al (Example 12) had a selectivity of only 63.8%. Thus, tin should be added through the impregnation of an organometallic tin compound that contains no halide.

EXAMPLE 10 (1:2 Pt/Sn/K—L-zeolite)

A catalyst was prepared by (1) calcining a potassium-sodium-type L zeolite at 873° K.; (2) impregnating the catalyst with 0.57 wt % tin using tributyltinacetate in methanol; (3) drying the catalyst at 393° K.; (4) calcining the catalyst at 573° K.; (5) impregnating the catalyst with 0.55 wt % platinum using tetrammineplatinum (II) nitrate; (6) drying the catalyst; (7) treating the catalyst with a mixture of 10% oxygen in helium at 533° K.; and (8) reducing the catalyst in hydrogen at 873° K.

EXAMPLE 11

The catalyst of Example 10 was loaded into a quartz reactor, reduced for 1 hour at 873° K. in flowing hydrogen, and used to convert isobutane at 873° K., 1 atm, 13 WHSV, and 2 H$_2$/HC. FIGS. 7(a) and 7(b) how this catalyst initially converted 60% of the isobutane with a dehydrogenation selectivity of 92.4%. After 22 h of operation the activity of the catalyst decreased with an isobutane conversion of 59.0%. The dehydrogenation selectivity at this conversion was 98.0%.

EXAMPLE 12

A catalyst was prepared by (1) calcining a potassium-sodium-type L zeolite at 873° K.; (2) impregnating the catalyst with 0.61 wt % tin using $SnCl_4$ in water; (3) drying the catalyst at 393° K.; (4) calcining the catalyst at 573° K.; (5) impregnating the catalyst with 0.55 wt % platinum using tetrammineplatinum (II) nitrate; (6) drying the catalyst; (7) treating the catalyst with a mixture of 10% oxygen in helium at 533° K.; and (8) reducing the catalyst in hydrogen at 873° K.

EXAMPLE 13

The catalyst of Example 12 was loaded into a quartz reactor, reduced for 1 hour at 873° K. in flowing hydrogen, and used to convert isobutane at 873° K., 1 atm, 13 WHSV, and 2 $H_2$/HC. FIGS. 7(a) and 7(b) show this catalyst initially converted 48.4% of the isobutane with a dehydrogenation selectivity of 81.7%. After 16 h of operation the activity of the catalyst decreased with an isobutane conversion of 31.3%. The dehydrogenation selectivity at this conversion was 63.8%.

Figure 8A:
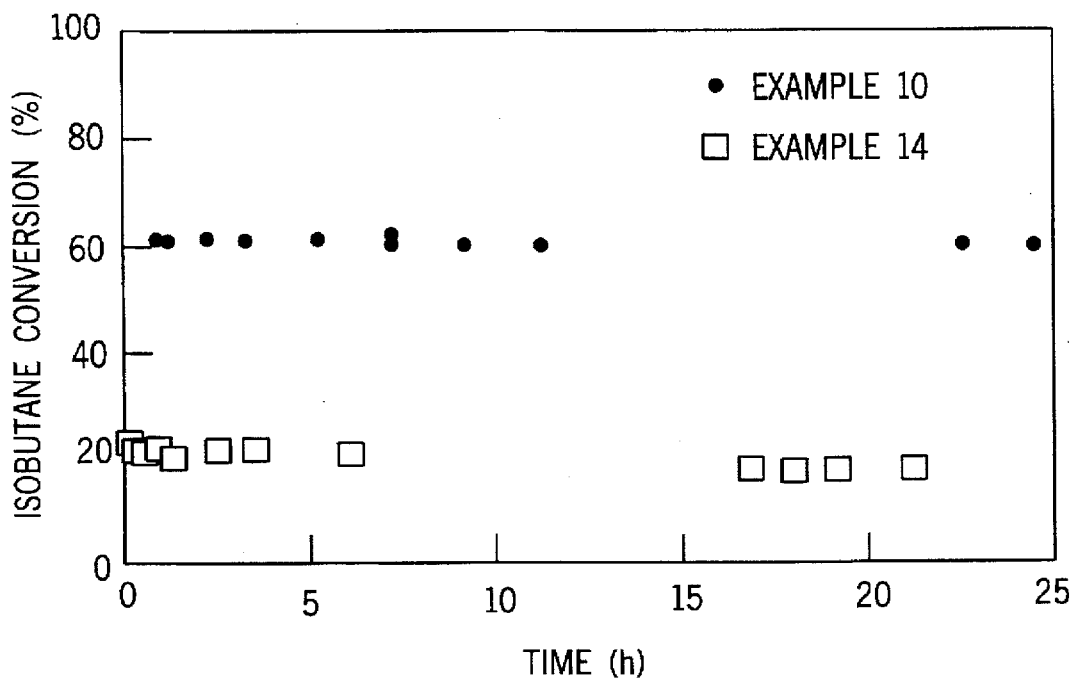
FIG. 8(a) is a graph illustrating the conversion of isobutane to isobutylene of a catalyst prepared with tin impregnation first, and a catalyst prepared with tin impregnation after platinum impregnation.
Figure 8B:
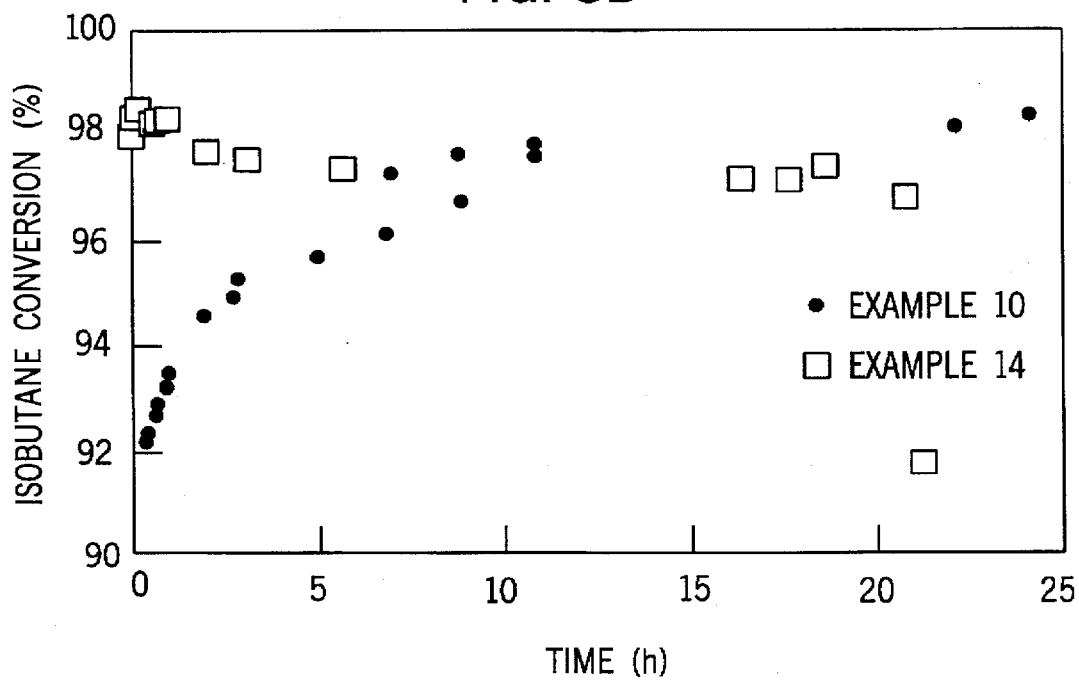
FIG. 8(b) is a graph illustrating the selectivity for conversion to isobutylene of the same two catalysts of FIG. 8(a).

We have discovered that tin should be added first through the impregnation of an organometallic tin compound, followed by a calcination, and then the addition of platinum. Reversing this procedure, i.e. adding the tin after the impregnation of platinum (see Examples 14–15) produces a catalyst that exhibits high selectivity but lower activity compared to catalyst prepared using the method disclosed herein as shown in FIGS. 8(a) and 8(b). Thus, we have discovered that the step of impregnating with tin should be performed first, before adding any platinum, in order to obtain a superior catalyst.

EXAMPLE 14 (1:2 Pt/Sn/K—L-zeolite)

A catalyst was prepare by (1) calcining a potassium-sodium-type L zeolite at 873° K.; (2) impregnating the catalyst with 0.55 wt % platinum using tetrammineplatinum (II) nitrate; (3) drying the catalyst; (4) treating the catalyst with a mixture of 10% oxygen in helium at 533° K.; (5) impregnating the catalyst with 0.57 wt % tin using tributyltinacetate in methanol; (6) drying the catalyst at 393° K.; (7) calcining the catalyst at 573° K.; and (8) reducing the catalyst in hydrogen at 873° K.

EXAMPLE 15

The catalyst of Example 14 was loaded into a quartz reactor, reduced for 1 hour at 873° K. in flowing hydrogen, and used to convert isobutane at 873° K. 1 atm, 13 WHSV, and 2 $H_2$/HC. FIGS. 8(a) and 8(b) show this catalyst initially converted 23.2% of the isobutane with a dehydrogenation selectivity of 97.8%. After 21 h of operation the activity of the catalyst decreased with an isobutane conversion was 17.4%. The dehydrogenation selectivity at this conversion was 96.5%.

There is also significance in the type of support utilized by Imai et al (Pt/Sn/alumina catalyst) versus that utilized in the present invention (Pt/Sn/K—L-zeolite catalyst).

Imai et al's Pt/Sn/alumina catalyst consists of oxidized tin that is incorporated in an alumina support. In Imai et al's preparation, $SnCl_4$ was added to a solution of aluminum chloride and a tin-alumina hydrogel was produced. The resulting hydrogel consisted of a small amount of tin uniformly dispersed throughout the alumina. The tin interacts with the alumina to produce a tin aluminate and the tin remains oxidized as $Sn^{2+}$. The reduced platinum is associated with the oxidized tin through the oxygen associated with the tin. On alumina the tin is present as $Sn^{2+}$, and the platinum is coordinated to oxygen. It appears that on the tin aluminate that tin acts to help maintain highly disperse and small platinum particles. In addition to tin, a halide such as chloride on the support is needed to suppress the movement of platinum on the surface and help to maintain small and highly disperse platinum particles. Alkali such as potassium is also added to this catalyst to neutralize the inherent acidity of the alumina and the chlorinated alumina and prevents the acid catalyzed reactions of the olefin products.

In contrast, the tin in the L-zeolite of the present invention interacts with the added platinum to form Pt/Sn alloy particles in the pores of the zeolite. As shown in FIG. 8(b) and Table 6 of the patent application, Mössbauer spectrum shows the formation of Pt/Sn alloy particles in L-zeolite. The tin that interacts with the platinum is the zero valence state and interacts directly with the platinum. It is believed that the small pores of L-zeolite promotes the rates of isobutane dehydrogenation and isobutylene hydrogenation through the stabilization of activated complexes of the elementary reaction steps. The pore diameter of the crystalline L-zeolite is 7.1 Angstroms. In contrast, γ-alumina has a pore diameter size distribution between 30 and 100 Angstroms.

EXAMPLE 16

The catalyst of Example 10 was loaded into a stainless steel reactor, reduced for 1 hour at 873° K. in flowing hydrogen, and used to convert isobutane at 873° K., 1 atm, 13 WHSV, and 2 $H_2$/HC. FIGS. 6 and 7 show this catalyst initially converted 60% of the isobutane with a dehydrogenation selectivity of 92.4%. After 50 h of operation the activity of the catalyst decreased with an isobutane conversion was 55.0%. The dehydrogenation selectivity at this conversion was 98.5%.

The above Examples 4–16 indicate that supporting platinum and tin on a neutralized L-zeolite produces a catalyst which converts isobutane to isobutylene with selectivities greater than 98%. The above Examples indicate higher ratios of tin to platinum produce catalysts with high initial dehydrogenation selectivity. However, at higher tin to platinum ratios the conversion rate decreases with time probably due to increase interaction of excess tin with the platinum. At lower tin to platinum ratio the initial dehydrogenation selectivity is lower but increases to greater than 97% after 3 hours of operation. At lower tin to platinum ratios the stability of the catalyst was much improved compared to the catalyst with higher Sn to Pt ratios.

Kinetic investigations at 773° K. suggest that adding potassium to supported platinum/tin catalyst increases the activity, stability and dehydrogenation selectivity for the isobutane reaction. See FIG. 3. These results suggest three roles of potassium in the catalyst: (1) potassium is needed to neutralize the support which eliminates side acid-catalyzed reactions, (2) the addition of potassium improves the initial dehydrogenation selectivity and (3) the addition of potassium improves the dehydrogenation activity at temperature below 773° K.

The above examples suggest platinum, tin, and potassium are all needed to achieve the desired high dehydrogenation selectivity. An optimized catalyst would be produced by adjusting the relative amounts of platinum, tin and potassium.

NOVEL MATERIAL FORMED

The kinetic data associated with this novel catalyst show that Pt/Sn—K—L, catalysts exhibit high activity for isobutane dehydrogenation (see FIG. 1), high selectivity for isobutane dehydrogenation (see Table 2), and sustained activity at reaction conditions conducive for coking (FIG. 2). Importantly, the 1:3.5 Pt/Sn/K—L catalyst exhibits higher dehydrogenation rates than the Pt/SiO$_2$ and 1:3 Pt/Sn/SiO$_2$ catalysts (FIG. 1), but the heats and uptakes for hydrogen and carbon monoxide adsorption are similar for the 1:3 Pt/Sn/SiO$_2$ and 1:3.5 Pt/Sn/K—L, catalysts, as shown in FIG. 5.

Platinum supported in L-zeolite generally exhibits high activity and selectivity for converting n-hexane into benzene, and these catalysts contain cluster-sized platinum particles within the channels of the zeolite. Table 2 shows that the Pt/Ba—L catalyst exhibits a significantly higher rate for isobutane conversion compared Pt/SiO$_2$, and the higher isobutane activity is because of higher isomerization and hydrogenolysis reaction rates. Accordingly, the Pt/L catalyst exhibits poor selectivity for isobutane dehydrogenation to isobutylene.

It was also observed that the Pt/Ba—L catalyst deactivated during these kinetic studies at 673° K. These results suggest that cluster-sized platinum particles in L-zeolite possess sufficiently large surface Pt ensembles to catalyze isomerization, hydrogenolysis, and coking reactions of isobutane.

Figure 4C:
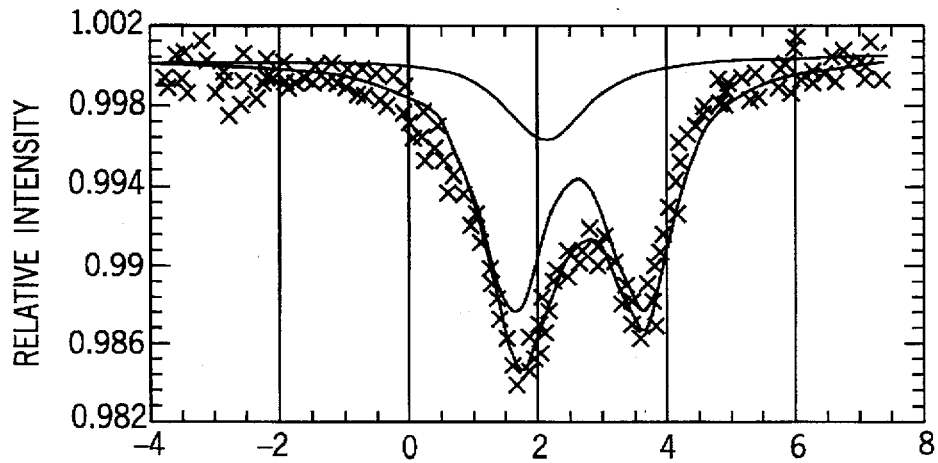

Table 2 shows that isobutane hydrogenolysis and isomerization are inhibited when tin is combined with platinum in L-zeolite or on silica. It has been suggested that tin decreases the size of surface Pt ensembles, thereby inhibiting the formation on the surface of highly dehydrogenated hydrocarbon species required for hydrogenolysis, isomerization, and coking reactions. For example, metal-catalyzed isomerization of isobutane occurs through a bond-shift mechanism involving the formation of triadsorbed intermediates. Previous studies have shown that neopentane isomerization over Pt is structure sensitive and proceeds through a bond-shift mechanism over larger Pt particles. Hydrogenolysis reactions require the removal of hydrogen atoms from the alkane molecule and the formation of highly dehydrogenated surface intermediates before the rate limiting C—C bond rupture. Analogous to the hydrogenolysis reaction, a large ensemble of surface Pt atoms is required for decomposition reactions leading to coke formation. The Mössbauer spectroscopic results show that tin interacts with platinum in L-zeolite to form Pt/Sn alloy particles (see FIG. 4c). As with Pt/Sn/SiO$_2$, it is suggested that tin reduces the size of surface platinum ensembles in L-zeolite, thereby inhibiting hydrogenolysis and isomerization reactions (see Table 2). The high dehydrogenation activity along with low hydrogen uptake suggests that the invention may relate to a novel material with a different type of catalytic sites for dehydrogenation.

The enhanced activity and selectivity of Pt/Sn/K—L catalyst for isobutane dehydrogenation can be attributed at least partially to the presence of potassium. The Mössbauer spectrum (see FIG. 4c) of reduced Pt/Sn/K—L indicates that tin is present as Sn$^{2+}$ in the L-zeolite as well as interacting with platinum to form Pt/Sn alloy particles. Previous studies have shown that ferrous cations can exchange with potassium in the micropores of L-zeolite upon dehydration. Similarly, it is suggested here that Sn$^{2+}$ can interchange with K$^+$ in the zeolite structure, and potassium displaced from ion exchange positions in the zeolite may interact with Pt/Sn particles in the catalyst. It was shown in a previous study that the addition of potassium to Pt/Sn/SiO$_2$ increases the rate of isobutane dehydrogenation and enhances the dehydrogenation selectivity. This previous investigation suggested that the addition of potassium to Pt/Sn/SiO$_2$ suppresses hydrogenolysis, isomerization, and coking reactions by further decreasing the size of the surface Pt ensembles. This invention shows that the addition of excess potassium to the 1:2 Pt/Sn/K—L catalyst further decreases the isomerization and hydrogenolysis rates (see Table 2) and enhances the rate of isobutane dehydrogenation (see FIG. 3). Table 3 shows that increasing the amount of tin in Pt/Sn/KL did not have a significant effect on the uptakes of absorbed hydrogen and carbon monoxide. Mössbauer spectroscopic results show that most of the tin in Pt/Sn/K—L interacts with the K—L zeolite, while a smaller fraction of tin interacts with platinum to form Pt/Sn alloy particles (see FIGS. 4(a)–(c)). Accordingly, the addition of excess tin does not necessarily increase the amount of tin interacting with platinum. The following general scheme is proposed for isobutane dehydrogenation over small ensembles of surface platinum atoms:

$C_4H_{10}+2* \rightarrow C_4H_9*+H*$     (step 1)

$C_4H_9*+* \rightleftharpoons C_4H_8*+H*$     (step 2)

$C_4H_8* \rightleftharpoons C_4H_8+*$     (step 3)

$H_2+2* \rightleftharpoons 2H_9$     (step 4)

It is reported elsewhere the deuterium is readily incorporated into isobutylene in flowing gas mixtures of isobutane with D$_2$ and in mixtures of isobutylene with D$_2$ over silica-supported Pt and Pt/Sn catalysts at 723° K. These deuterium tracing results suggest that Steps 2, 3, and 4 are equilibrated and Step 1 is rate limiting under the reaction conditions used in our studies. The following rate expression is appropriate for this case:

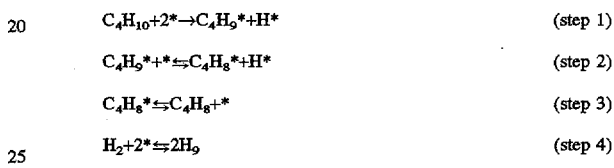

$$\text{rate} = \frac{k_1 P_{C_4H_{10}}}{(1+\sqrt{K_4 P_{H_2}})}$$

This rate expression gives zero order kinetics with respect to hydrogen pressure at conditions of low hydrogen coverages. Table 5 shows that the dehydrogenation reaction over 1.2 wt % Pt/SiO$_2$ is nearly zero order with respect to hydrogen at 723° K. and hydrogen pressures less than 350 Torr.

The negative orders with respect to hydrogen pressure for isobutane dehydrogenation over Pt/Sn/SiO$_2$ catalysts as shown in Table 5, suggest that the addition of Sn to Pt/SiO$_2$ increases the hydrogen coverage on the dehydrogenation sites. It has been shown that the presence of tin suppresses both the adsorption and desorption rates of hydrogen on Pt(111) surface. The higher apparent activation energy for dehydrogenation over the Pt/Sn/SiO$_2$ catalyst, shown in Table 4, may thus be attributed to the larger influence of hydrogen pressure on this catalysts, i.e., the apparent rate constant has a contribution from the equilibrium constant K$_4$.

The lower dehydrogenation rates over Pt/Sn/SiO$_2$ compared to Pt/SiO$_2$ suggest that the addition of tin decreases the rate of dissociative adsorption of isobutane. It has been shown that the presence of tin in the surface layer of Sn/Pt(111) surface alloys decreases the binding energy of molecular isobutane. A decrease in binding energy of this molecularly-adsorbed precursor state would decrease the rate for the dissociative adsorption of isobutane.

Both the 1:3.5 Pt/Sn/K—L and 1:3 Pt/Sn/SiO$_2$ catalysts have a small number of sites for hydrogen and carbon monoxide adsorption, and these sites adsorb H$_2$ and CO weakly compared to Pt/SiO$_2$, as shown in FIG. 5. However, the 1:3.5 Pt/Sn/K—L catalyst exhibits a significantly higher turnover frequency for dehydrogenation than the 1:3 Pt/Sn/SiO$_2$ catalyst (FIG. 1). Moreover, the negative orders with respect to hydrogen (see Table 5) and higher apparent activation energy (see Table 4) suggest a significant influence of hydrogen pressure over the 1:3.5 Pt/Sn/K—L catalyst for isobutane dehydrogenation. The higher dehydrogenation rates over the Pt/Sn/K—L catalysts suggest that the zeolite pore structure and/or the presence of potassium promote the rate of dissociative adsorption of isobutane. For example, a molecularly-adsorbed isobutane precursor state may be stabilized by the zeolite pore structure or by excess potassium, thereby increasing the rate for the dissociative adsorption, of isobutane. Furthermore, the rates of isobutane isomerization and hydrogenolysis are significantly higher over Pt/Ba—L compared to Pt/SiO$_2$ catalysts, and these higher rates may also be explained by stabilization of molecularly-adsorbed isobutane species in the zeolite pore structure.

CONCLUSION

Effective catalysts for dehydrogenation of isobutane to isobutylene can be produced by supporting tin and platinum in K—L zeolite. These catalysts exhibit high activity and selectivity for isobutane dehydrogenation after long periods of time at temperatures from 673–873° K. Mössbauer spectroscopic results show that some of the tin interacts with platinum to form Pt/Sn alloy particles in reduced Pt/Sn/K—L catalysts, while the remainder of the tin interacts with the zeolite and is present as Sn$^{2+}$. It appears that Sn$^{2+}$ can interchange with K$^+$ in the zeolite structure, and potassium displaced from ion exchange positions in the zeolite may interact with Pt/Sn particles in the catalyst. The addition of excess potassium to Pt/Sn/K—L catalysts further enhances the dehydrogenation activity and selectivity. It is suggested that tin and potassium in Pt/Sn/K—L decrease the size of surface Pt ensembles, thereby inhibiting isomerization and hydrogenolysis reactions of isobutane. Microcalorimetric measurements show that the heats and uptakes for hydrogen and carbon monoxide adsorption are similar for the 1:3 Pt/Sn/SiO$_2$ and 1:3.5 Pt/Sn/K—L catalysts; however, the Pt/Sn/K—L catalyst exhibits a significantly higher rate of isobutane dehydrogenation. The zeolite pore structure and/or the presence of potassium in the Pt/Sn/K—L catalyst appear to promote the rate of dissociative adsorption of isobutane.

LEGEND FOR FIGURES

FIG. 1 Turnover frequencies for isobutylene production over silica-supported catalysts at 723° K., 12.5 Torr isobutane, 75 Torr hydrogen, 760 Torr total pressure, and isobutane conversions less than 2.5% [■ 1:3.5 Pt/Sn/K—L (0.55% Pt), ● Pt/SiO$_2$ (1.2% Pt), □ 1:3 Pt/Sn/SiO$_2$ (1.2% Pt)]

FIG. 2 Turnover frequencies for isobutylene production over silica-supported catalysts at 773° K., 109 Torr isobutane and 651 Torr helium. [● 1:3.5 Pt/Sn/K—L (0.55% Pt), □ 1:2.5 Pt/Sn/K—L (0.44% Pt), □ 1:2 Pt/Sn/K—L (0.58% Pt), ◊ 1:3 Pt/Sn/SiO$_2$ (1.2% Pt)]

FIG. 3 Turnover frequencies for isobutylene production over silica-supported catalysts at 773° K., 109 Torr isobutane and 651 Torr helium. [□ 1:2:2 Pt/Sn(K) K—L-zeolite (0.58% Pt) and □ 1:2 Pt/Sn/K—L (0.58% Pt)]

FIG. 4 Mössbauer spectra at 298° K. of (a) 1% Sn/K—L after oxidation at 573° K. for 1 h, (b) 1% Sn/K—L after reduction for 6 h at 773° K., and (c) 1:3.5 Pt/Sn/K—L after reduction for 6 h at 773° K.

FIG. 5 Differential heats at 403° K. versus adsorbate coverage for adsorption of (a) hydrogen (b) and carbon monoxide. [○ Pt/SiO$_2$ 31(1.2% Pt), □ 1:3 Pt/Sn/SiO$_2$ (1.2% Pt), ● 1:3.5 Pt/Sn/K—L (0.55% Pt)]

FIG. 6 Isobutane dehydrogenation at 873° K., 2/1 H$_2$/HC ratio, 13.2 h$^{-1}$ WHSV, 1 atm pressure a) Isobutane conversion, (b) Isobutane dehydrogenation selectivity to isobutylene.

FIG. 7(a) Isobutane conversion at 873° K., 2/1 H$_2$/HC ratio, 13.2 h$^{-1}$ WHSV, 1 atm pressure. (Example 10—Pt/Sn/K—L zeolite with tributyltinacetate as the tin precursor; Example 12—Pt/Sn/K—L zeolite with SnCl$_4$ as the tin precursor).

FIG. 7(b) Isobutane selectivity at 873° K., 2/1 H$_2$/HC ratio, 13.2 h$^{-1}$ WHSV, 1 atm pressure. (Example 10—Pt/Sn/K—L zeolite with tributyltinacetate as the tin precursor; Example 12—Pt/Sn/K—L zeolite with SnCl$_4$ as the tin precursor).

FIG. 8(a) Isobutane conversion at 873° K., 2/1 H$_2$/HC ratio, 13.2 h$^{-1}$ WHSV, 1 atm pressure. (Example 10—Pt/Sn/K—L zeolite with tin impregnation first; Example 14—Pt/Sn/K—L zeolite with tin impregnation after platinum impregnation).

FIG. 8(b) Isobutane selectivity at 873° K., 2/1 H$_2$/HC ratio, 13.2 h$^{-1}$ WHSV, 1 atm pressure. (Example 10—Pt/Sn/K—L zeolite wih tin impregnation first; Example 14—Pt/Sn/K—L zeolite with tin impregnation after platinum impregnation).

We claim:

1. A catalyst for catalyzing the dehydrogenation of paraffin hydrocarbons, consisting essentially of:

a type L-zeolite, containing from 0.05% to 3.0% by weight of a Group VIII metal selected from the group consisting of platinum, nickel and palladium; from 0.05% to 6.0% by weight of a Group IVA metal selected from the group consisting of tin, germanium and lead; from 10.0% to 17.0% by weight of a Group IA metal selected from the group consisting of potassium, lithium, sodium, rubidium and cesium; wherein an atomic ratio of said Group IVA metal to said Group VIII metal is greater than 1:1; and wherein an atomic ratio of said Group IA metal to said Group VIII metal is greater than 1:1; and wherein said catalyst is produced by the steps of impregnating from 0.05% to 6.0% by weight of a Group IVA metal into a potassium-type L-zeolite to form a Group IVA metal-zeolite support before adding any Group VIII metal and in the absence of any halide;

calcining the Group IVA metal-zeolite support; and impregnating from 0.05% to 3.0% by weight of a Group VIII metal into the Group IVA-zeolite support to form a Group IVA-Group VIII-zeolite support.

2. The catalyst of claim 1 wherein said Group VIII metal is platinum, said Group IVA metal is tin, and said Group IA metal is potassium.

3. The catalyst of claim 1 wherein the atomic ratio of said Group IVA metal to said Group VIII metal is 1.5:1 or greater.

4. A process for producing a dehydrogenation catalyst comprising the steps of:

impregnating from 0.05% to 6.0% by weight of a Group IVA metal into a potassium-type L-zeolite to form a Group IVA metal-zeolite support before adding any Group VIII metal and in the absence of any halide;

calcining the Group IVA metal-zeolite support;

impregnating from 0.05% to 3.0% by weight of a Group VIII metal into the Group IVA-zeolite support to form a Group IVA-Group VIII-support;

wherein an atomic ratio of Group IVA to Group VIII metal is greater than 1:1 and an atomic ratio of potassium to Group VIII metal is greater than 1:1.

5. The process of claim 3 wherein the Group IVA metal is selected from tin, germanium and lead.

6. The process of claim 3 wherein the Group VIII metal is selected from platinum, nickel and palladium.

7. The process of claim 3 wherein the Group IVA metal-zeolite support contains 0.7% to 1.2% tin.

8. The process of claim 3 wherein the Group IVA-Group VIII-zeolite support contains 0.1% to 2.0% platinum.

9. The process of claim 3 further including the step of treating the Group IVA-Group VIII-zeolite support with helium after incorporating the Group VIII metal.

10. The process of claim 9 further including the step of reducing the Group IVA-Group VIII-zeolite support with hydrogen after treating with helium.

11. The process of claim 3 further including the step of calcining the potassium-type L-zeolite prior to incorporating the Group IVA metal.

12. The process of claim 3 wherein the steps of incorporating the Group IVA and Group VIII metals are both accomplished by impregnating the potassium-type L-zeolite.

13. A process for producing a dehydrogenation catalyst comprising the steps:

calcining a potassium-type L-zeolite at a temperature of 873° K. to 923° K.;

before adding any platinum and in the absence of any halide impregnating the catalyst with 0.7% to 1.2% tin using tributyltin acetate in methanol;

drying the catalyst at a temperature of 373° K. to 423° K.;

calcining the catalyst at a temperature ranging from 523° K. to 623° K.;

impregnating the catalyst with 0.1 weight % to 2.0 weight % platinum using tetrammineplatinum (II) nitrate;

drying the catalyst;

treating the catalyst with a 10% oxygen-helium mixture at 473° K. to 573° K.; and reducing the catalyst in hydrogen at a temperature ranging from 773° K. to 873° K.

* * * * *

UNITED STATES PATENT AND TRADEMARK OFFICE
CERTIFICATE OF CORRECTION

PATENT NO. : 5,736,478
DATED : April 7, 1998
INVENTOR(S) : Randy D. Cortright et al It is certified that error appears in the above-indentified patent and that said Letters Patent is hereby corrected as shown below:

Claim 1, col. 20, line 34　　　　After "zeolite" delete ","
(Claim 26, line 3,

Claim 4, col. 21, line 3　　　　After "Group VIII-" insert ---zeolite---
(Claim 29, line 8, Claim 13, col. 22, line 10　　　After "halide" insert ---,---
(Claim 38, line 5, Signed and Sealed this Ninth Day of November, 1999

Attest:

Attesting Officer

Q. TODD DICKINSON

Acting Commissioner of Patents and Trademarks